(12) United States Patent
Li et al.

(10) Patent No.: US 11,394,520 B2
(45) Date of Patent: Jul. 19, 2022

(54) CONSIDERATIONS ON BANDWIDTH PART (BWP) MANAGEMENT FOR ULTRA-RELIABILITY LOW LATENCY COMMUNICATION (URLLC)

(71) Applicant: QUALCOMM Incorporated, San Diego, CA (US)

(72) Inventors: Chih-Ping Li, San Diego, CA (US); Peter Pui Lok Ang, San Diego, CA (US); Wanshi Chen, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/361,166

(22) Filed: Mar. 21, 2019

(65) Prior Publication Data

US 2019/0296882 A1 Sep. 26, 2019

Related U.S. Application Data

(60) Provisional application No. 62/647,594, filed on Mar. 23, 2018.

(51) Int. Cl.
*H04L 5/00* (2006.01)
*H04W 72/04* (2009.01)
*H04W 72/14* (2009.01)
*H04W 28/02* (2009.01)
*H04W 72/08* (2009.01)

(52) U.S. Cl.
CPC .......... *H04L 5/0082* (2013.01); *H04L 5/0064* (2013.01); *H04L 5/0094* (2013.01); *H04L 5/0096* (2013.01); *H04W 28/0268* (2013.01); *H04W 72/046* (2013.01); *H04W 72/0446* (2013.01); *H04W 72/0453* (2013.01); *H04W 72/087* (2013.01); *H04W 72/14* (2013.01)

(58) Field of Classification Search
CPC ... H04L 5/0082; H04L 5/0064; H04L 5/0094; H04L 5/0096; H04W 72/0453; H04W 28/0268; H04W 72/0446; H04W 72/046; H04W 72/087; H04W 72/14
See application file for complete search history.

(56) References Cited

U.S. PATENT DOCUMENTS

| 11,115,156 | B2* | 9/2021 | Wei | H04W 76/28 |
|---|---|---|---|---|
| 2019/0081679 | A1* | 3/2019 | Davydov | H04L 5/0057 |
| 2019/0103953 | A1* | 4/2019 | Liao | H04W 76/28 |
| 2019/0104543 | A1* | 4/2019 | Park | H04L 1/1854 |
| 2019/0132824 | A1 | 5/2019 | Jeon et al. | |
| 2019/0132845 | A1* | 5/2019 | Babaei | H04L 1/1812 |

(Continued)

FOREIGN PATENT DOCUMENTS

TW 1578828 B 4/2017

OTHER PUBLICATIONS

Babaei et al. U.S. Appl. No. 62/630,436, filed Feb. 14, 2018 (Year: 2018).*

(Continued)

*Primary Examiner* — Wutchung Chu
(74) *Attorney, Agent, or Firm* — Patterson + Sheridan, L.L.P.

(57) ABSTRACT

Certain aspects of the present disclosure relate generally to wireless communications systems, and more particularly, to improving efficiency of bandwidth part (BWP) switching.

31 Claims, 11 Drawing Sheets

RECEIVE SIGNALING FOR A BANDWIDTH PART (BWP) SWITCH, FROM A FIRST BWP TO A SECOND BWP, TO PROCESS TRAFFIC FOR TRANSMISSION TO OR FROM THE UE — 902

APPLY THE BWP SWITCH WITHIN A SLOT TRANSMISSION TIME INTERVAL (TTI) TO PROCESS THE TRAFFIC — 904

(56) References Cited

U.S. PATENT DOCUMENTS

| | | | | |
|---|---|---|---|---|
| 2019/0132857 | A1* | 5/2019 | Babaei | H04W 72/1252 |
| 2019/0149305 | A1* | 5/2019 | Zhou | H04L 5/0055 370/330 |
| 2019/0182000 | A1* | 6/2019 | Futaki | H04L 1/0693 |
| 2019/0215712 | A1* | 7/2019 | Babaei | H04W 24/10 |
| 2019/0215847 | A1* | 7/2019 | Abdoli | H04W 72/02 |
| 2019/0215870 | A1* | 7/2019 | Babaei | H04L 5/001 |
| 2019/0254056 | A1* | 8/2019 | Salah | H04W 72/0446 |
| 2020/0037260 | A1* | 1/2020 | Fu | H04W 80/08 |
| 2020/0084753 | A1* | 3/2020 | Li | H04L 5/0094 |
| 2020/0186319 | A1* | 6/2020 | Liao | H04L 5/0098 |
| 2020/0344034 | A1* | 10/2020 | Moon | H04W 72/02 |
| 2020/0358587 | A1* | 11/2020 | Wang | H04W 72/1289 |
| 2020/0374844 | A1* | 11/2020 | Takeda | H04W 72/0446 |
| 2020/0382157 | A1* | 12/2020 | Bhamri | H04B 1/7156 |
| 2021/0075581 | A1* | 3/2021 | Takeda | H04W 72/042 |

OTHER PUBLICATIONS

Abdoli et al. U.S. Appl. No. 62/616,118, filed Jan. 11, 2018 (Year: 2018).*

Huawei., et al., "Summary of Remaining Issues on Bandwidth Part and Wideband Operation", 3GPP Draft; R1-1801347, 3rd Generation Partnership Project (3GPP), Mobile Competence Centre, 650, Route Des Lucioles ; F-06921 Sophia-Antipolis Cedex, France, vol. RAN WG1, No. Athens, Greece; Feb. 26, 2018-Mar. 2, 2018, Feb. 17, 2018 (Feb. 17, 2018), 13 Pages, XP051397511, Retrieved from the Internet: URL: http://www.3gpp.org/ftp/tsg_ran/WG1_RL1/TSGR1_92/Docs/ [retrieved on Feb. 17, 2018].

International Search Report and Written Opinion—PCT/US2019/023622—ISA/EPO—dated May 21, 2019.

Mediatek Inc: "Remaining Details on UL/DL Resource Allocation," 3GPP Draft; R1-1801681 Remaining Details on UL DL Resource Allocation Mediatek, 3rd Generation Partnership Project (3GPP), Mobile Competence Centre; 650, Route Des Lucioles; F-06921 Sophia-Antipolis, vol. RAN WG1, No. Athens, Greece; Feb. 26, 2018-Mar. 2, 2018, Feb. 17, 2018, XP051397681, 10 pages, Retrieved from the Internet: URL: http://www.3gpp.org/ftp/tsg%5Fran/WG1%5FRL1/TSGR1%5F92/Docs/ [retrieved on Feb. 17, 2018], figures 1, 2, 3, 4 p. 3, lines 25-32 p. 4, lines 2-7 p. 5, lines 1-9.

OPPO: "Remaining Issues on Bandwidth Part Configuration and Activation," 3GPP Draft; R1-1719975, 3rd Generation Partnership Project (3GPP) , Mobile Competence Centre; 650, Route Des Lucioles; F-0691 Sophia-Antipolis Cedex; France, vol. RAN WG1, No. Reno, USA; Nov. 27, 2017-Dec. 1, 2017, Nov. 18, 2017, XP051369671, 5 Pages, Retrieved from the Internet: URL: http://www.3gpp.org/ftp/tsg%5Fran/WG1%5FRL1/TSGR1%5F91/Docs [retrieved on Nov. 18, 2017] the whole document.

QUALCOMM Incorporated: "CR on Active DL BWP for Starting DRX on Durations," 3GPP Draft; R2-1801439 CR on Active DL BWP for Starting DRC on Durations, 3rd Generation Partnership Project (3GPP), Mobile Competence Centre; 650, Route Des Lucioles; F-06921 Sophia-Antipolis Cedex, vol. RAN WG2, No. Vancouver, Canada; Jan. 22, 2018-Jan. 26, 2018, Jan. 12, 2018, XP051386848, 4 pages, Retrieved from the Internet: URL: http://www.3gpp.org/ftp/tsg%5Fran/WG2%5FRL2/TSGR2%5FAHs/2018%5F01%5FNR/Docs/[retrieved on Jan. 12, 2018] p. 3, lines 11-19.

VIVO: "Remaining Issues on Multiplexing Data with Different Transmission Durations," 3GPP Draft; R1-1719798 Multiplexing Data With Different Transmission Durations Final, 3rd Generation Partnership Project (3GPP), Mobile Competence Centre; 650, Route Des Lucioles; F-06921 Sophia-Antipolis, vol. RAN WG1, No. Reno, USA; Nov. 27, 2017-Dec. 1, 2017, Nov. 18, 2017, XP051369541, 11 Pages, Retrieved from the Internet: URL: http://www.3gpp.org/ftp/tsg%5Fran/WG1%5FRL1/TSGR1%5F91/Docs/ [retrieved on Nov. 18, 2017], p. 7, lines 14-39 p. 8, lines 15-24.

VIVO: "Potential Solutions and Techniques for NR Unlicensed Spectrum", 3GPP Draft, R1-1801557, 3rd Generation Partnership Project (3GPP), Mobile Competence Centre, 650, Route Des Lucioles, F-06921 Sophia-Antipolis, France, vol. RAN WG1, No. Athens, Greece, Feb. 26, 2018-Mar. 2, 2018, Feb. 15, 2018 (Feb. 15, 2018), XP051396809, 6 Pages, Retrieved from the Internet: URL:http://www.3gpp.org/ftp/tsg%5Fran/WG1%5FRL1/TSGR1%5F92/Docs/ [retrieved on Feb. 15, 2018], Section 3.2.

Huawei, et al., "Common Aspects or TDD NB-IoT", 3GPP TSG RAN WG1 Meeting #92, Athens, Greece, Feb. 26-Mar. 2, 2018, R1-1801439, Athens, Greece, Feb. 26-Mar. 2, 2018 3GPP Feb. 16, 2018, https://www.3gpp.org/ftp/TSG_RAN/WG1_RL1/TSGR1_92/Docs/R1-1801439.zip, 6 Pages.

Taiwan Search Report—TW108110041—TIPO—Apr. 29, 2022.

* cited by examiner

CONSIDERATIONS ON BANDWIDTH PART (BWP) MANAGEMENT FOR ULTRA-RELIABILITY LOW LATENCY COMMUNICATION (URLLC)

FIELD OF THE DISCLOSURE

The present Application for Patent claims benefit of U.S. Provisional Patent Application Ser. No. 62/647,594, filed Mar. 23, 2018, assigned to the assignee hereof and hereby expressly incorporated by reference herein.

BACKGROUND

Field of the Disclosure

Aspects of the present disclosure relate generally to wireless communications systems, and more particularly, to managing frequency resources for certain types of traffic.

Description of Related Art

Wireless communication systems are widely deployed to provide various telecommunication services such as telephony, video, data, messaging, broadcasts, etc. These systems may employ multiple-access technologies capable of supporting communication with multiple users by sharing available system resources (e.g., bandwidth and transmit power). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations (BSs) that each can simultaneously support communication for multiple communication devices, otherwise known as user equipment (UEs). In LTE or LTE-A network, a set of one or more gNBs may define an e NodeB (eNB). In other examples (e.g., in a next generation, new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a NR BS, a NR NB, a network node, a 5G NB, a next generation NB (gNB), etc.). A gNB or DU may communicate with a set of UEs on downlink channels (e.g., for transmissions from a base station or to a UE) and uplink channels (e.g., for transmissions from a UE to a gNB or DU).

These multiple access technologies have been adopted in various telecommunication standards to provide a common protocol that enables different wireless devices to communicate on a municipal, national, regional, and even global level. NR (e.g., 5G radio access) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

Such improvements may help achieve Ultra-reliable low latency communication (URLLC) objectives. URLLC generally refers to communications services for applications, such as factory automation and autonomous driving, that require both low latency (e.g., response time in one or several milliseconds) and high reliability (e.g., loss of less than 1 in 1e5 packets)

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communication by a network entity. The method generally includes determining traffic for transmission to or from a user equipment (UE) is of a first type and signaling the UE for a bandwidth part (BWP) switch, from a first BWP to a second BWP, wherein the BWP switch is to be applied within a slot transmission time interval (TTI).

Certain aspects of the present disclosure provide a method for wireless communication by a user equipment (UE). The method generally includes receiving signaling for a bandwidth part (BWP) switch, from a first BWP to a second BWP, to process traffic for transmission to or from the UE and applying the BWP switch within a slot transmission time interval (TTI) to process the traffic.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
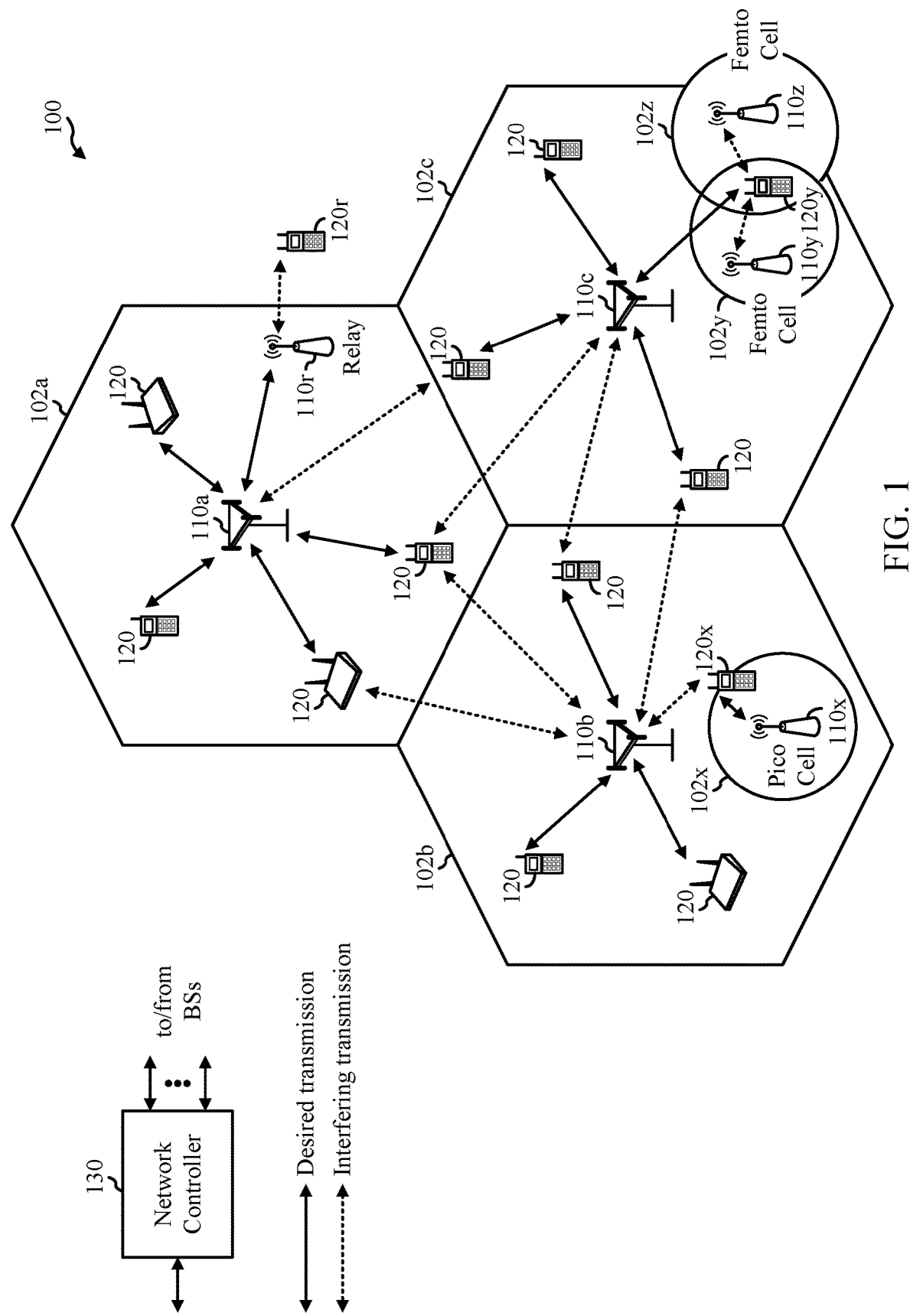
FIG. 1 is a block diagram conceptually illustrating an example telecommunications system, in accordance with certain aspects of the present disclosure.

As noted above, in addition to latency requirements, applications such as URLLC have relatively stringent requirements in terms of reliability. In some cases, these adaptations, such as bandwidth resource (e.g., BWP) switching may help satisfy these requirements. Unfortunately, there are challenges with BWP switching. For example, random URLLC traffic may not be served during BWP switching, resulting in high latency overhead.

Aspects of the present disclosure, however, provide techniques that may help serve different types of traffic, by controlling BWP switching, for example, based on the type (or types) of traffic to be served. Available BWPs may be configured to optimize various objectives, such as flexible gNB scheduling or power savings.

Aspects of the present disclosure provide apparatus, methods, processing systems, and computer readable mediums for managing frequency resources for different types of traffic having different quality of service (QoS) requirements. For example, the techniques may be used to adapt bandwidth parts (BWPs) for processing ultra reliable low latency communications (URLLC) and/or enhanced mobile broad band (eMBB) traffic.

The techniques presented herein may be applied in a variety of wireless networks, such as NR (new radio access technology or 5G technology). NR may support various wireless communication services, such as enhanced mobile broadband (eMBB) targeting wide bandwidth (e.g. 80 MHz beyond), millimeter wave (mmW) targeting high carrier frequency (e.g. 27 GHz or beyond), massive machine type communications (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In certain systems, (e.g., 3GPP Release-13 long term evolution (LTE) networks), enhanced machine type communications (eMTC) are supported, targeting low cost devices, often at the cost of lower throughput. eMTC may involve half-duplex (HD) operation in which uplink transmissions and downlink transmissions can both be performed—but not simultaneously. Some eMTC devices (e.g., eMTC UEs) may look at (e.g., be configured with or monitor) no more than around 1 MHz or six resource blocks (RBs) of bandwidth at any given time. eMTC UEs may be configured to receive no more than around 1000 bits per subframe. For example, these eMTC UEs may support a max throughput of around 300 Kbits per second. This throughput may be sufficient for certain eMTC use cases, such as certain activity tracking, smart meter tracking, and/or updates, etc., which may consist of infrequent transmissions of small amounts of data; however, greater throughput for eMTC devices may be desirable for other cases, such as certain Internet-of-Things (IoT) use cases, wearables such as smart watches, etc.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the network 100 may include a network entity (such as gNB 110b) that performs operations 800 of FIG. 8 to adapt frequency resources (e.g., via a BWP switch 112) for serving a UE (such URLLC UE 120u) that performs operations 900 of FIG. 9.

The wireless network 100 may, for example, be a new radio (NR) or 5G network. A UE 120 may be configured for enhanced machine type communications (eMTC). The UE 120 may be considered a low cost device, low cost UE, eMTC device, and/or eMTC UE. The UE 120 can be configured to support higher bandwidth and/or data rates (e.g., higher than 1 MHz). The UE 120 may be configured with a plurality of narrowband regions (e.g., 24 resource blocks (RBs) or 96 RBs). The UE 120 may receive a resource allocation, from a gNB 110, allocating frequency hopped resources within a system bandwidth for the UE 120 to monitor and/or transmit on. The resource allocation can indicate non-contiguous narrowband frequency resources for uplink transmission in at least one subframe. The resource allocation may indicate frequency resources are not contained within a bandwidth capability of the UE to monitor for downlink transmission. The UE 120 may determine, based on the resource allocation, different narrowband than the resources indicated in the resource allocation from the gNB 110 for uplink transmission or for monitoring. The resource allocation indication (e.g., such as that included in the downlink control information (DCI)) may include a set of allocated subframes, frequency hopping related parameters, and an explicit resource allocation on the first subframe of the allocated subframes. The frequency hopped resource allocation on subsequent subframes are obtained by applying the frequency hopping procedure based on the frequency hopping related parameters (which may also be partly included in the DCI and configured partly through radio resource control (RRC) signaling) starting from the resources allocated on the first subframe of the allocated subframes.

As illustrated in FIG. 1, the wireless network 100 may include a number of gNBs 110 and other network entities. A gNB may be a station that communicates with UEs. Each gNB 110 may provide communication coverage for a particular geographic area. In 3GPP, the term "cell" can refer to a coverage area of a Node B and/or a NB subsystem serving this coverage area, depending on the context in which the term is used. In NR systems, the term "cell" and NB, next generation NB (gNB), 5G NB, access point (AP), BS, NR BS, or transmission reception point (TRP) may be interchangeable. In some examples, a cell may not necessarily be stationary, and the geographic area of the cell may move according to the location of a mobile gNB. In some examples, the gNBs may be interconnected to one another and/or to one or more other gNBs or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, a tone, a subband, a subcarrier, etc. Each frequency may support a single RAT in a given geographic area in order to avoid interference between wireless networks of different RATs. In some cases, NR or 5G RAT networks may be deployed.

A gNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A gNB for a macro cell may be referred to as a macro gNB. A gNB for a pico cell may be referred to as a pico gNB. A gNB for a femto cell may be referred to as a femto gNB or a home gNB. In the example shown in FIG. 1, the gNBs 110a, 110b and 110c may be macro gNBs for the macro cells 102a, 102b and 102c, respectively. The gNB 110x may be a pico gNB for a pico cell 102x. The gNBs 110y and 110z may be femto gNB for the femto cells 102y and 102z, respectively. A gNB may support one or multiple (e.g., three) cells.

The wireless network 100 may also include relay stations. A relay station is a station that receives a transmission of data and/or other information from an upstream station (e.g., a gNB or a UE) and sends a transmission of the data and/or other information to a downstream station (e.g., a UE or a gNB). A relay station may also be a UE that relays transmissions for other UEs. In the example shown in FIG. 1, a relay station 110r may communicate with the gNB 110a and a UE 120r in order to facilitate communication between the gNB 110a and the UE 120r. A relay station may also be referred to as a relay gNB, a relay, etc.

The wireless network 100 may be a heterogeneous network that includes gNBs of different types, e.g., macro gNB, pico gNB, femto gNB, relays, etc. These different types of gNBs may have different transmit power levels, different coverage areas, and different impact on interference in the wireless network 100. For example, a macro gNB may have a high transmit power level (e.g., 20 Watts) whereas pico gNB, femto gNB, and relays may have a lower transmit power level (e.g., 1 Watt).

The wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. The techniques described herein may be used for both synchronous and asynchronous operation.

A network controller 130 may couple to a set of gNBs and provide coordination and control for these gNBs. The network controller 130 may communicate with the gNBs 110 via a backhaul. The gNBs 110 may also communicate with one another, for example, directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a gNB, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices.

In FIG. 1, a solid line with double arrows indicates desired transmissions between a UE and a serving gNB, which is a gNB designated to serve the UE on the downlink and/or uplink. A finely dashed line with double arrows indicates interfering transmissions between a UE and a gNB.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (e.g., an RB) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of two half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In LTE, the basic transmission time interval (TTI) or packet duration is the 1 subframe. In NR, a subframe is still 1 ms, but the basic TTI is referred to as a slot. A subframe contains a variable number of slots (e.g., 1, 2, 4, 8, 16, . . . slots) depending on the tone-spacing (e.g., 15, 30, 60, 120, 240 . . . kHz).

In some examples, access to the air interface may be scheduled, wherein a scheduling entity (e.g., a gNB) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. gNBs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
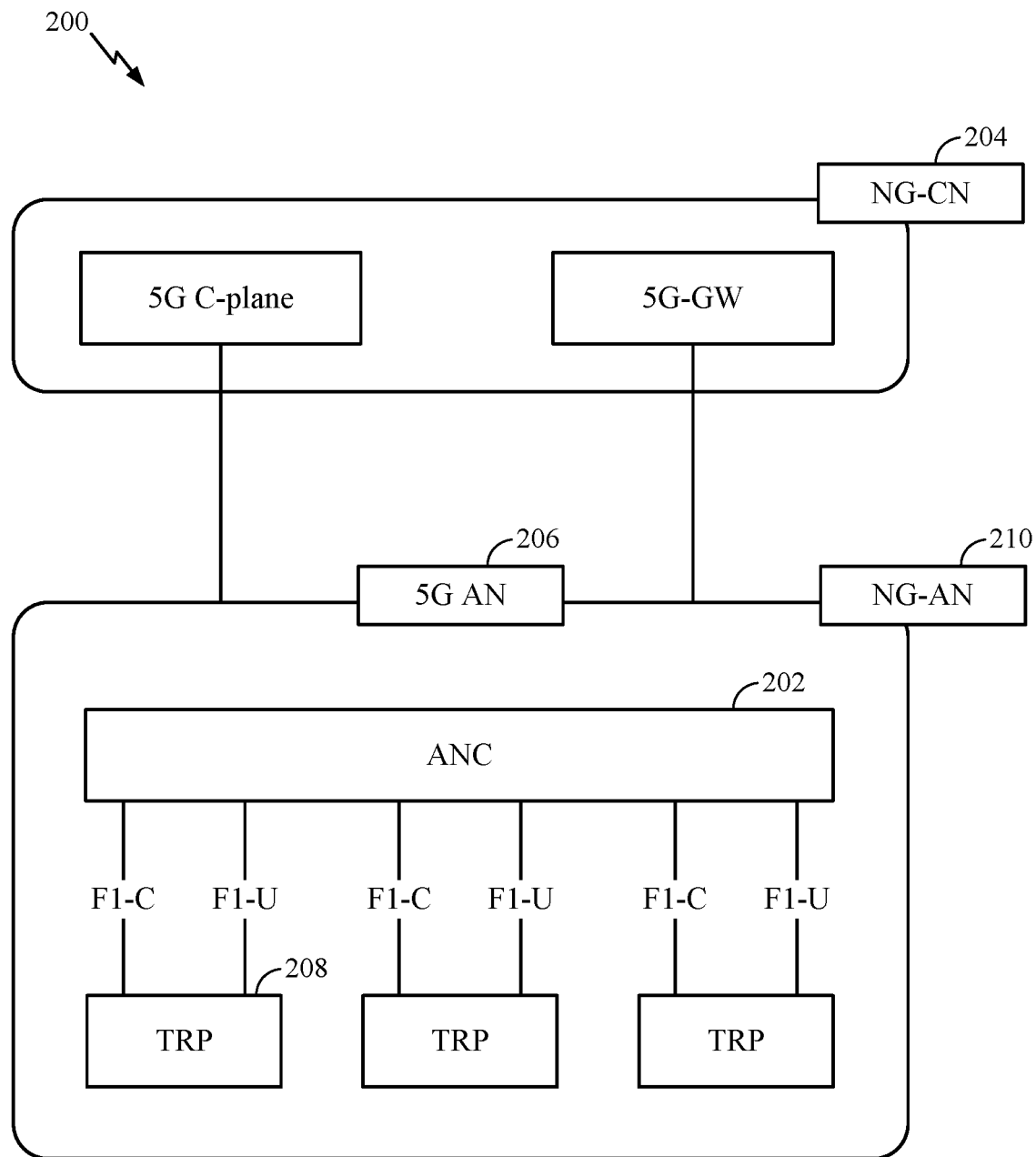
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC 202 may be a central unit (CU) of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208 (which may also be referred to as BSs, NR BSs, gNBs, or some other term).

The TRPs 208 may be a DU. The TRPs may be connected to one ANC (ANC 202) or more than one ANC (not illustrated). For example, for RAN sharing, radio as a service (RaaS), and service specific AND deployments, the TRP 208 may be connected to more than one ANC. A TRP may include one or more antenna ports. The TRPs may be configured to individually (e.g., dynamic selection) or jointly (e.g., joint transmission) serve traffic to a UE.

The logical architecture of the distributed RAN 200 may support fronthauling solutions across different deployment types. For example, the logical architecture may be based on transmit network capabilities (e.g., bandwidth, latency, and/or jitter). The logical architecture may share features and/or components with LTE. The NG-AN 210 may support dual connectivity with NR. The NG-AN 210 may share a common fronthaul for LTE and NR. The logical architecture may enable cooperation between and among TRPs 208. For example, cooperation may be preset within a TRP and/or across TRPs via the ANC 202. An inter-TRP interface may be present.

The logical architecture of the distributed RAN 200 may support a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively).

Figure 3:
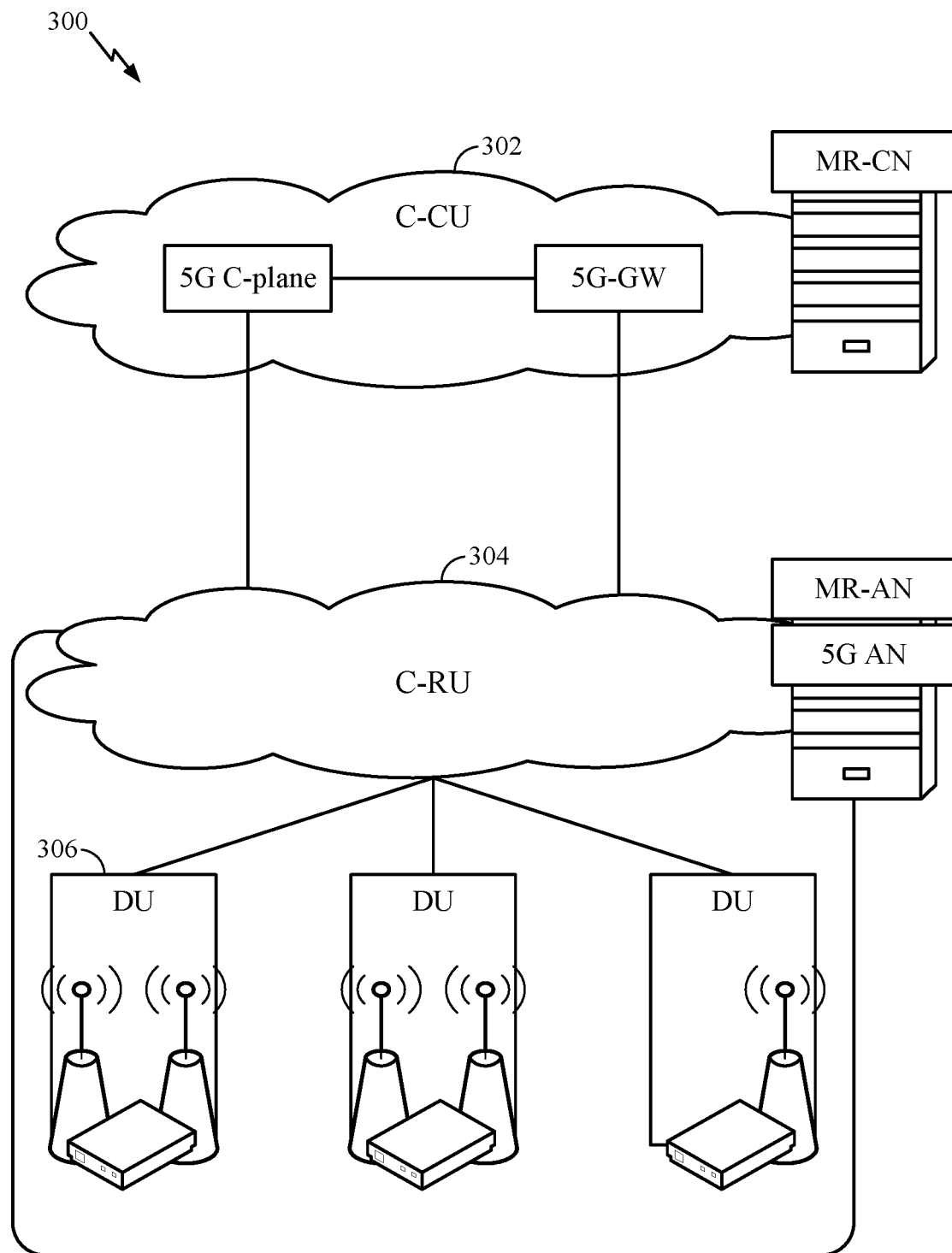
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. The C-RU 304 may host core network functions locally. The C-RU 304 may have distributed deployment. The C-RU 304 may be closer to the network edge.

A DU 306 may host one or more TRPs (e.g., an edge node (EN), an edge unit (EU), a radio head (RH), a smart radio head (SRH), or the like). The DU may be located at edges of the network with radio frequency (RF) functionality.

Figure 4:
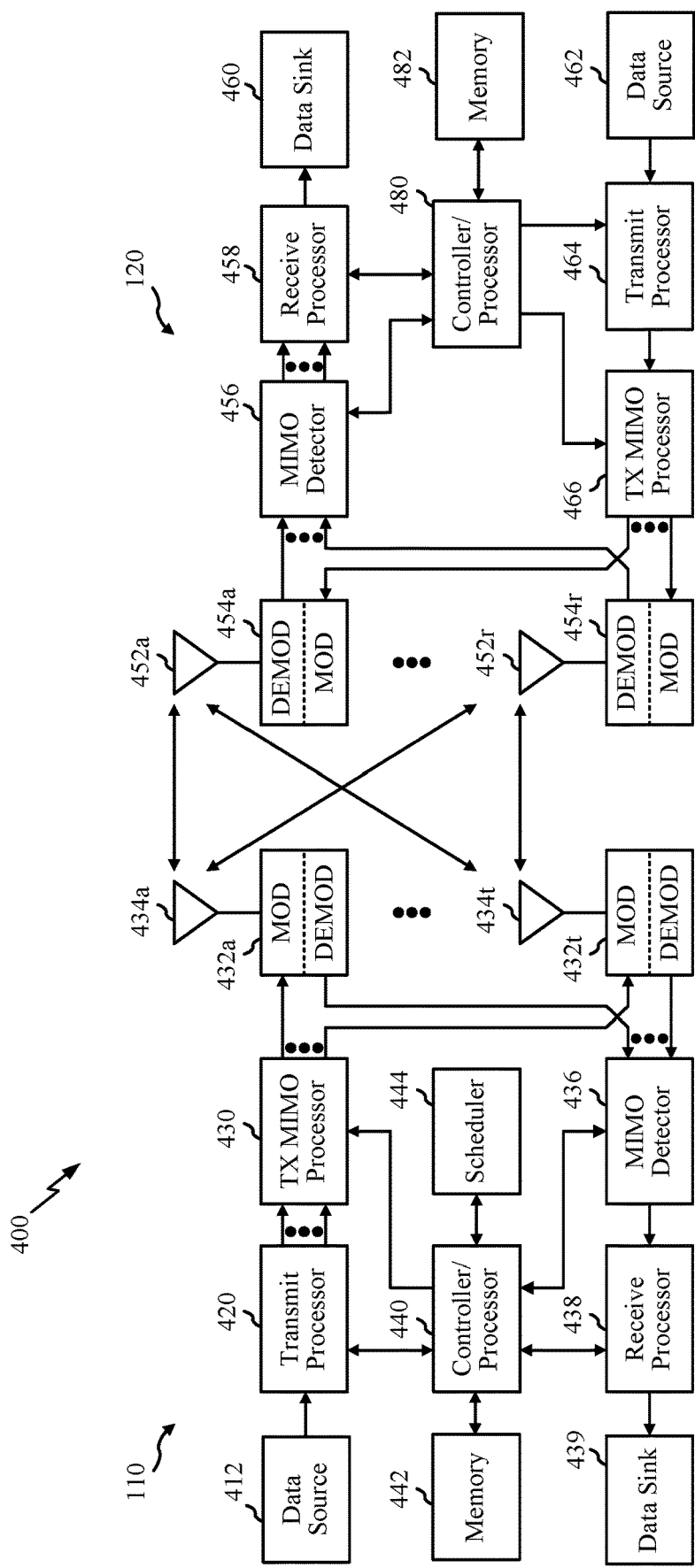
FIG. 4 is a block diagram conceptually illustrating a design of an example base station (BS) and user equipment (UE), in accordance with certain aspects of the present disclosure.

FIG. 4 illustrates example components of the gNB 110 and UE 120 illustrated in FIG. 1, which may be used to implement aspects of the present disclosure for frequency hopping for large bandwidth allocations. For example, antennas 452, Tx/Rx 222, processors 466, 458, 464, and/or controller/processor 480 of the UE 120 and/or antennas 434, processors 460, 420, 438, and/or controller/processor 440 of the gNB 110 may be used to perform the operations described herein and illustrated with reference to FIGS. 9-11.

FIG. 4 shows a block diagram of a design of a gNB 110 and a UE 120, which may be one of the gNBs and one of the UEs in FIG. 1. For a restricted association scenario, the gNB 110 may be the macro gNB 110c in FIG. 1, and the UE 120 may be the UE 120y. The gNB 110 may also be gNB of some other type. The gNB 110 may be equipped with antennas 434a through 434t, and the UE 120 may be equipped with antennas 452a through 452r.

At the gNB 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the gNB 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the gNB 110. At the gNB 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the gNB 110 and the UE 120, respectively. The processor 440 and/or other processors and modules at the gNB 110 may perform or direct, e.g., the execution of various processes for the techniques described herein. The processor 480 and/or other processors and modules at the UE 120 may also perform or direct, e.g., the execution of the functional blocks illustrated in FIGS. 9 and 11, and/or other processes for the techniques described herein. The processor 440 and/or other processors and modules at the gNB 110 may also perform or direct, e.g., the execution of the functional blocks illustrated in FIG. 10, and/or other processes for the techniques described herein. The memories 442 and 482 may store data and program codes for the gNB 110 and the UE 120, respectively. A scheduler 444 may schedule UEs for data transmission on the downlink and/or uplink.

Figure 5:
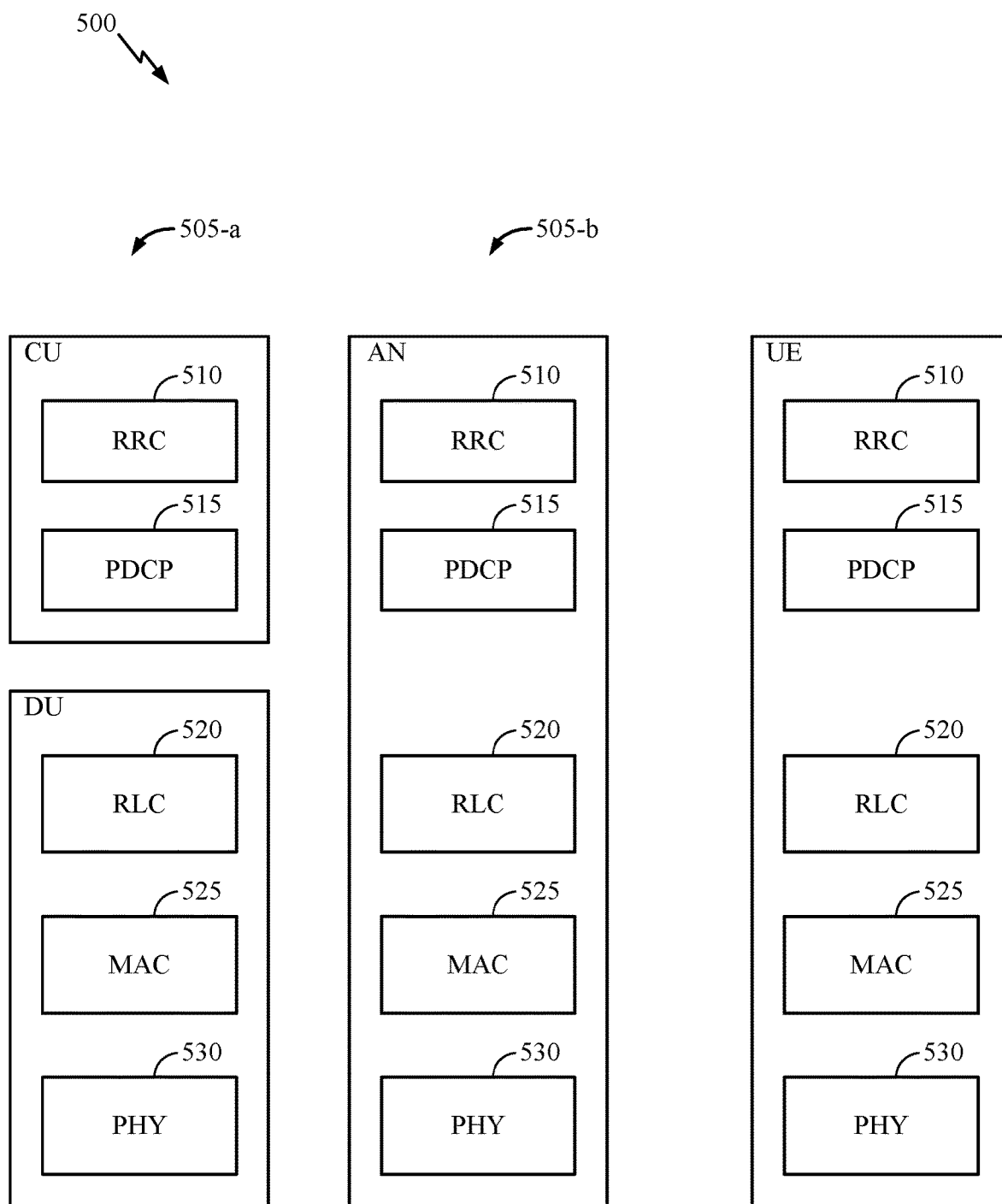
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
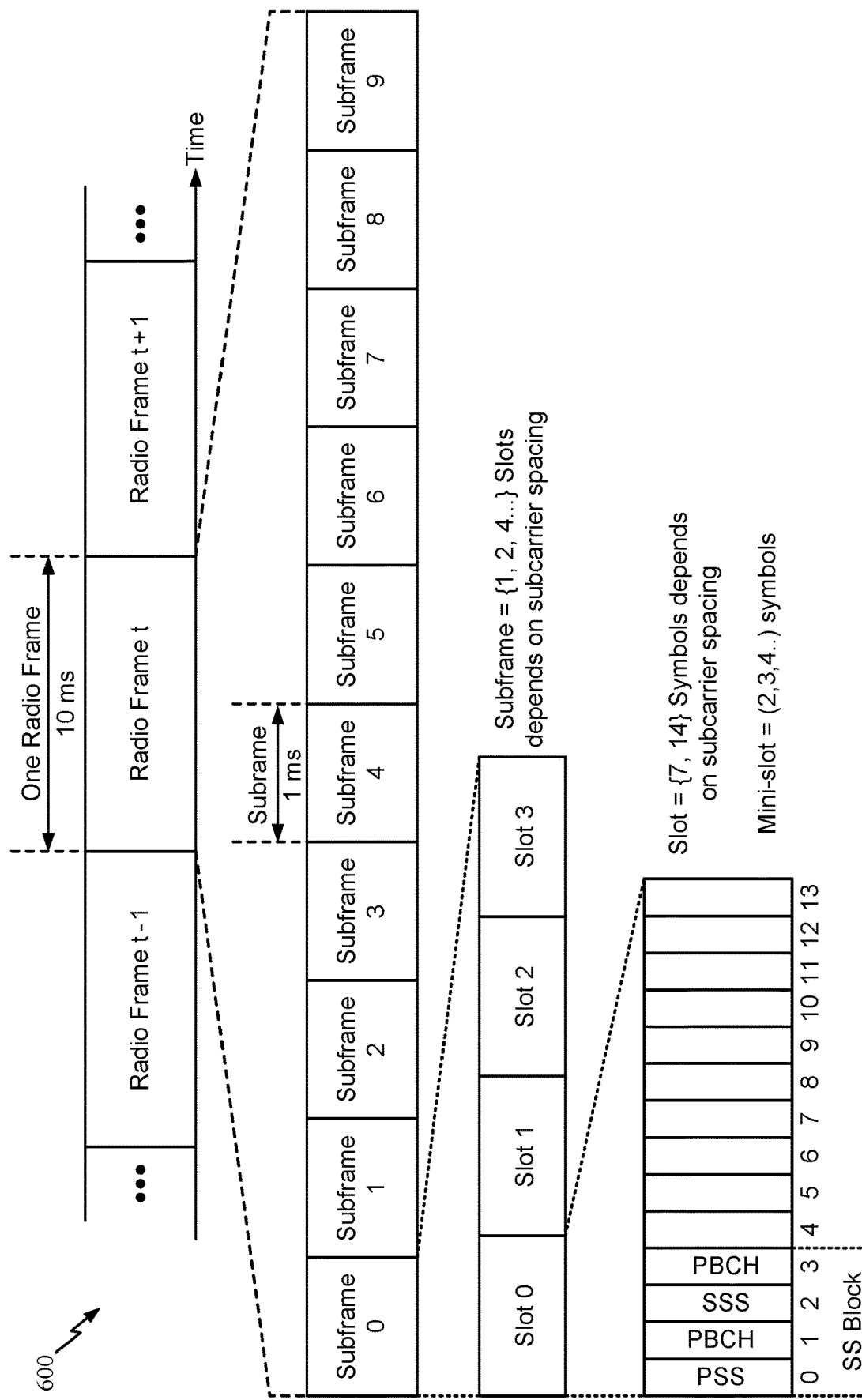
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or gNB), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Aspects of the present disclosure provide apparatus, methods, processing systems, and computer program products for new radio (NR) (new radio access technology or 5G technology). New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service. The RAN may include a central unit (CU) and distributed units (DUs). A NR Node B (e.g., 5G Node B) may correspond to one or multiple transmission reception points (TRPs).

URLLC generally refers to relatively tight (e.g., stringent) requirements for successful delivery of a packet within a stringent deadline (e.g., 1 ms) with very high probability (e.g., 99.999%) of success. The reliability of a downlink (DL) transmission depends on the reliability of both the physical downlink control channel (PDCCH) and the physical downlink shared channel (PDSCH). The reliability of the PDSCH can be improved with the use of hybrid automatic repeat request (HARM) (or automatic repeat request (ARQ)) that allows the receiver to combine different copies of the same data packet. However, the PDSCH packet (data packet) is not decodable if the corresponding PDCCH (control packet) is not detected. When the size of the data packet is comparable with that of the control packet (as in many URLLC applications), the control channel becomes the bottleneck of the overall communication. Certain aspects of the present disclosure provide apparatus and techniques for improving the reliability of PDCCH decoding by adapting frequency resources via BWP management.

Example BWP Management for URLLC

Aspects of the present disclosure relate generally to wireless communications systems, and more particularly, to managing frequency resources for certain types of traffic. For example, aspects of the present disclosure may help enable dynamic adaptation of bandwidth part (BWP) allocation, via BWP switching at the mini-slot or even symbol level (as opposed to slot level).

As noted above, techniques presented herein may help serve different types of traffic, by controlling BWP switching, for example, based on the type (or types) of traffic to be served, such as ultra reliable low latency communications (URLLC) and/or enhanced mobile broad band (eMBB) traffic. Available BWPs may be configured to optimize various objectives, such as flexible gNB scheduling or power savings.

As used herein, the term bandwidth part (BWP) generally refers to a set of (e.g., contiguous) physical resource blocks (PRBs). The PRBs of a BWP may be selected from a contiguous subset of the common resource blocks, for example, for a given numerology on a given carrier. As used herein, the term numerology generally referring to a set of parameters, such as subcarrier spacing, cyclic prefix length, and the like.

The BWP switching approach described herein may provide a mechanism to adaptively adjust the effective operating BW of a UE. For example, supporting BWP switching at the mini-slot or symbol level may allow the use of a more optimal resource allocation sooner, rather than requiring a UE to wait to the end of a slot. BWP switching is conventionally performed at the slot-level, meaning a BWP switch received in one slot will not go into effect until at least a subsequent slot. Such faster switching, as proposed herein, may help improve support of certain types of traffic, such as random and/or periodic URLLC traffic.

With conventional, slot-level BWP switching, random URLLC traffic cannot be served during BWP switching, resulting in high latency overhead. Although the potential latency associated with slot-level BWP switching may be acceptable for some periodic URLLC traffic (e.g., 5 ms periodicity w/1 ms deadline). Typically a gNB commands BWP switching during the idle period.

Figure 7:
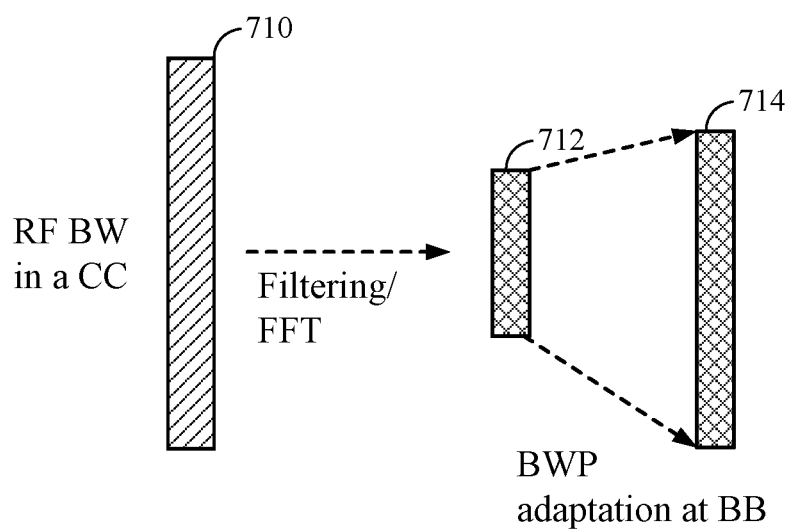
FIG. 7 illustrates an example of bandwidth part adaptation, in accordance with certain aspects of the present disclosure.

As noted above, aspects of the present disclosure may utilize mini-slot or even symbol-level BWP switching. As illustrated in FIG. 7, to enable fast switching, RF bandwidth 710 may be entirely on (enabled) in a component carrier (CC). For receiving (Rx), BWP adaptation may, thus, be performed at the baseband level, for example, via post analog-to-digital (post-ADC) filtering or via fast Fourier transform (FFT) adjustment. As an example, such BWP adaptation may be performed to rapidly switch from a first (narrow) BWP 712 to a second (larger) BWP 714 or vice-versa. In some cases, CC bandwidth may be UE-specific. This faster switching and reduced latency provided by the techniques described herein may be suitable for both random and periodic URLLC traffic.

Figure 8:
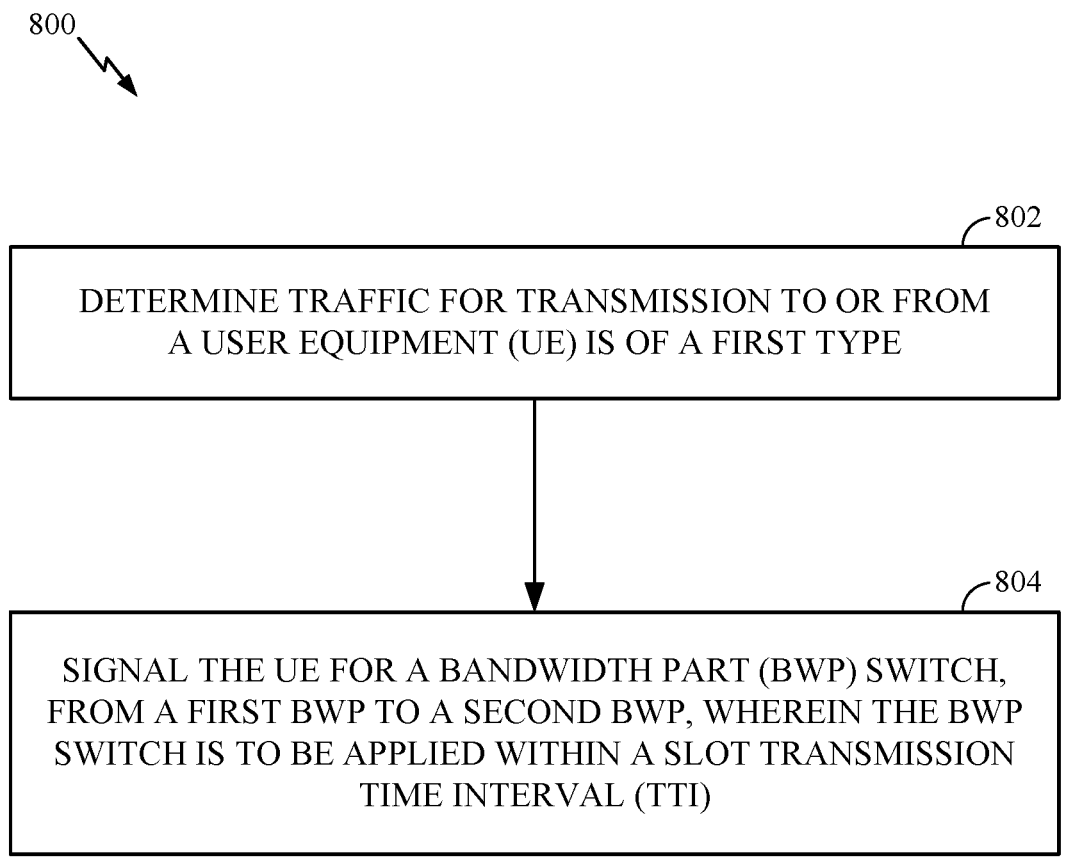
FIG. 8 illustrates example operations for wireless communication by a network entity (e.g., a gNB), in accordance with certain aspects of the present disclosure.

FIG. 8 illustrates example operations 800 that may be performed by a network entity (e.g., a gNB), for BWP switching, in accordance with aspects of the present disclosure. The operations 800 may be performed, for example, by a base station 110 shown in FIG. 1 (e.g., a gNB (or other type base station).

Operations 800 begin, at 802, by determining traffic for transmission to or from a user equipment (UE) is of a first type. At 804, the network entity signals the UE for a bandwidth part (BWP) switch, from a first BWP to a second BWP, wherein the BWP switch is to be applied within a slot transmission time interval (TTI). In some cases, a UE may be configured (e.g., via RRC signaling) with different BWP configurations (e.g., with the BWP configurations shown in FIGS. 10 and 11 as examples). In such cases, a gNB may signal one configuration (or BWP within a configuration) for a UE to switch to. This may be done, for example, by dedicated RRC Signaling or a MAC control element (MAC CE). In some cases, the BWP switch may be signaled as an index via downlink control information (DCI), for example in a PDCCH that schedules the traffic.

Figure 9:
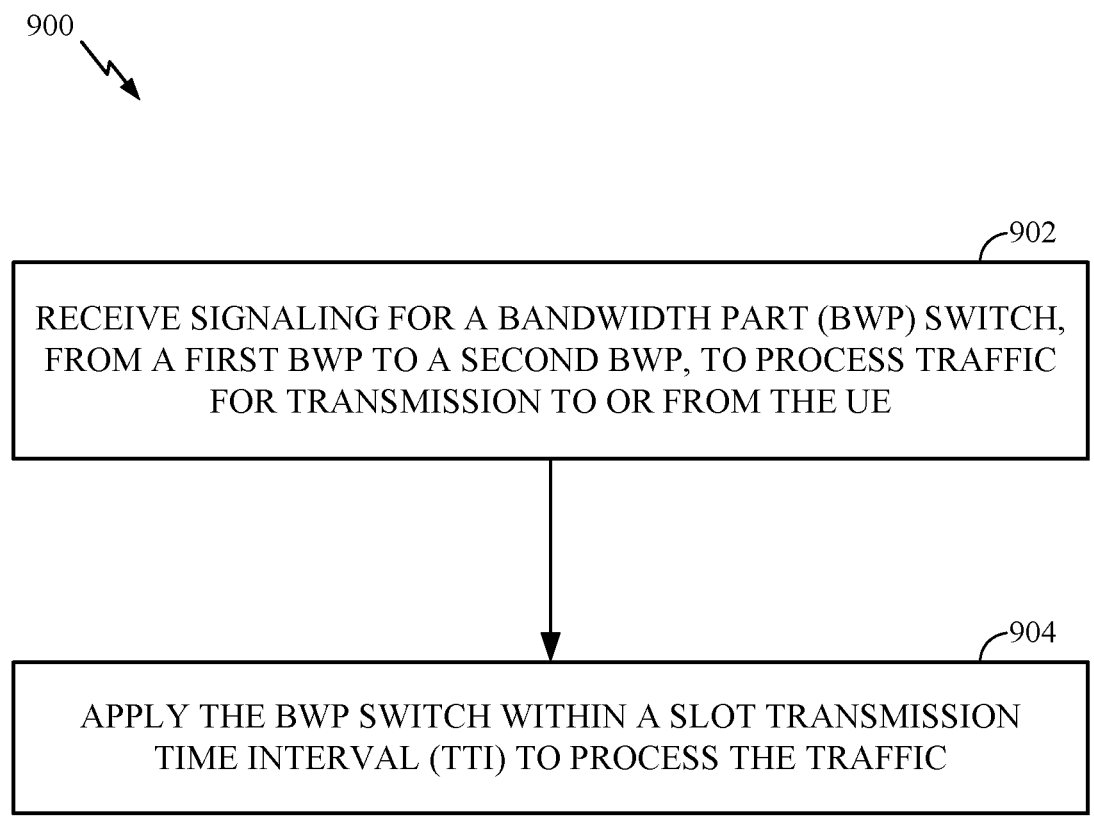
FIG. 9 illustrates example operations for wireless communication by a user-equipment (UE), in accordance with certain aspects of the present disclosure.

FIG. 9 illustrates example operations 900 that may be performed by a UE, such as a UE in communication with a gNB performing operations 800 described above. For example, the operations 900 may be performed, for example, by a UE (e.g., a UE 120 of FIG. 1) to process a BWP switch sent by a network entity performing operations 800 described above Operations 900 begin, at 902, by receiving signaling for a bandwidth part (BWP) switch, from a first BWP to a second BWP, to process traffic for transmission to or from the UE. As noted above, the UE may be configured with different BWP configurations and a BWP switch may be signaled by indicating one of the configurations, for example, via RRC or DCI signaling.

At 904, the UE applies the BWP switch within a slot transmission time interval (TTI) to process the traffic. The UE may apply the BWP switch by adjusting RF components accordingly (e.g., updating BWP filtering and/or FFT settings). In some cases, the UE may be configured with components that support flexible updating of BWP filters in the event of BWP switching.

Figure 10:
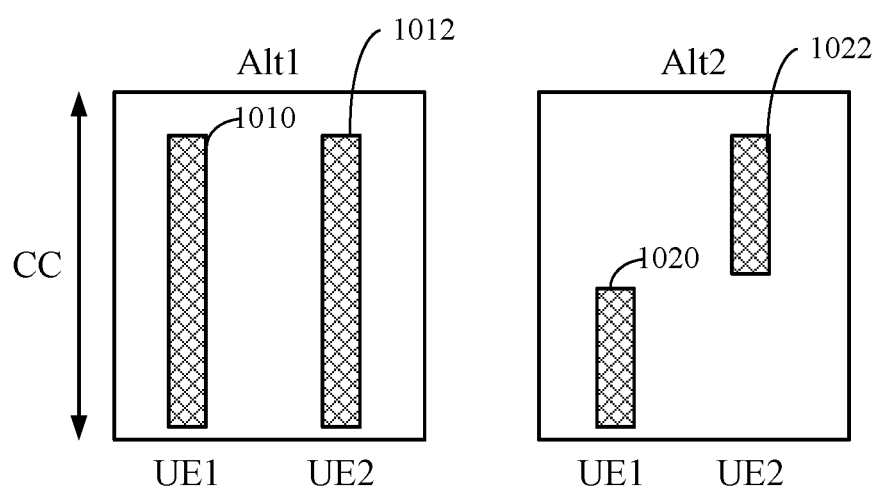
FIG. 10 illustrates example of bandwidth part configuration, in accordance with certain aspects of the present disclosure.

FIG. 10 illustrates an example BWP configuration. For grant-based URLLC, for example, wideband BWP is configured by RRC to exploit trunking efficiency. In this case, labeled as Alt 1 in FIG. 10, the gNB scheduling may be fully flexible and able to allocate overlapping portions of wideband BWPs 1010 and 1012 to UE1 and UE2. As an alternative, labeled as Alt 2, UEs may be configured with disjoint narrow BWPs 1020 and 1022 (which may provide better power saving). Across UEs, BWPs could be non-overlapping, partially overlapping, or fully overlapping.

For grant free (GF) and/or semi-statically or semi-persistently scheduled (SPS) URLLC traffic, narrow BWP may be suitable, for example, if preconfigured resources can fit in the narrowband. Event in the event of GF or SPS scheduled traffic, retransmissions may still grant-based.

There are various options for Intra-UE multiplexing of BWPs to support URLLC traffic. Intra-UE multiplexing generally refers to multiplexing BWPs for different types of traffic handled by the same UE. In some cases, multiple active BWPs may be supported for Intra-UE BWP multiplexing.

Figure 11:
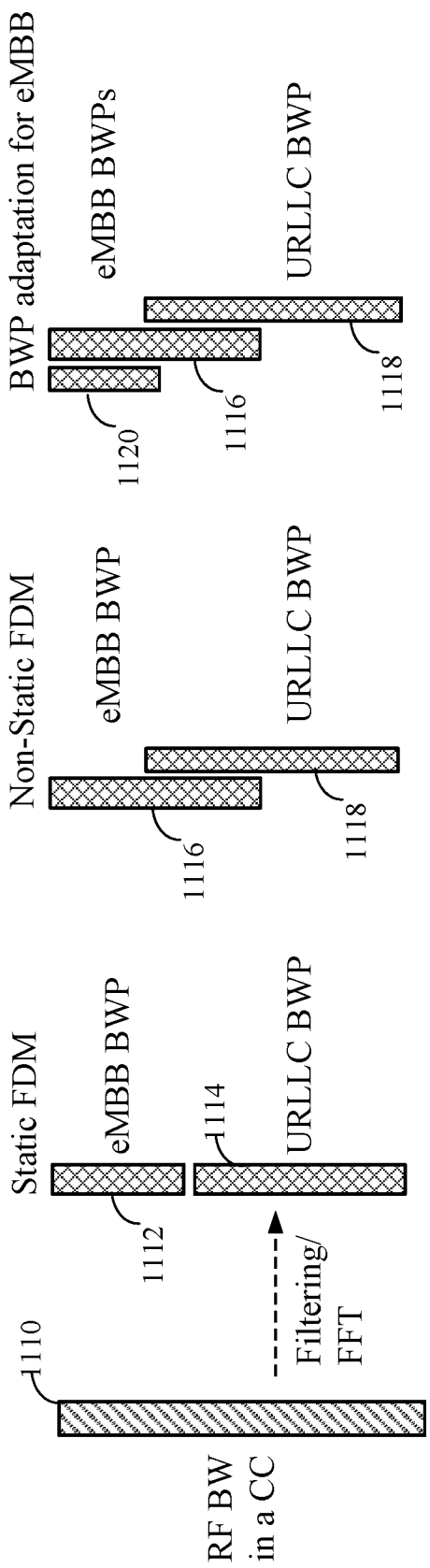
FIG. 11 illustrates example bandwidth part frequency division multiplexing (FDM), in accordance with certain aspects of the present disclosure.

FIG. 11 illustrates examples of static and non-static frequency division multiplexing (FDM) of available RF BW 1110 for BWP adaptation. Static FDM, using fixed disjoint BWPs 1112 and 1114 for eMBB and URLLC respectively, may not be ideal for resource utilization. As illustrated, non-static FDM can be facilitated with overlapping BWPs 1116 and 1118, and dynamic scheduling may activate the appropriate BWP depending on traffic.

As also illustrated in FIG. 11, further BWP adaptation can be independently managed across BWP belonging to different traffic type. For example, eMBB may be configured with a narrow BWP 1120 and a wide BWP 1122, while URLLC may be configured with only a wide BWP 1118. For two concurrent active BWPs (e.g., eMBB and URLLC), eMBB can have BWP adaptation between narrow and wide, without affecting the URLLC active BWP (e.g., with BWP 1120 allowed for eMBB traffic even when URLLC BWP 1118 is used for URLLC).

Various options also exist for resource allocation configuration and corresponding signaling. For URLLC resource allocation configuration, there are at least two options. According to one option, resource allocation is independent of BWP (e.g., with respect to CC). According to a second option, resource allocation may be configured per BWP, for example, with one independent resource allocation for each BWP or shared resource allocation across multiple BWPs.

For the first option, resource allocation may take more bits, for example, if the entire CC has to be addressed. In some configurations, resources may not be contained within a certain BWP, or only partially contained within the BWP. One way to handle this constraint is to consider resources not available for those BWP.

For the second option, a two BWP (2-BWP) case may be considered a base case. More than two BWPs can be supported through extrapolation. For the 2-BWP case, one BWP may be referred to as a narrow BWP and the other may be referred to as a wide BWP.

In one case, the narrow BWP may be a subset of wide BWP (as in the case of BWP 1120 and 1122 shown in FIG. 11). In this case, narrow BWP resource allocation (RA) type 0 may be used to point to wide BWP and resource allocation granularity may be obtained (increased accordingly) by scale up the resource block group (RBG) size (the typical RA type 0 granularity).

As an alternative, narrow BWP RA type 1 may be used to point to wide BWP. This may be a bit more complicated, for example, as an RIV (resource indication value) interpretation may result in a different number of contiguous PRBs and starting PRBs, depending on the BWP. One option to address this is to interpret the RA based on the narrow BWP, and then directly map the PRBs to the wide BWP. For both RA types 0 and 1, there may be no problem using wide BWP RA to point to narrow BWP.

In another case, a narrow BWP may not overlap (or only partially overlap) with a wide BWP. In this case, RA can still be interpreted with respect to some reference location within the BWP. For example, RA may always be with respect to the lowest-frequency PRB of the BWP. As another example, the reference location could be based on configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

EXAMPLE EMBODIMENTS

Embodiment 1

A method for wireless communications by a user equipment (UE), comprising receiving signaling for a bandwidth part (BWP) switch, from a first BWP to a second BWP, to process traffic for transmission to or from the UE and applying the BWP switch within a slot transmission time interval (TTI) to process the traffic.

Embodiment 2

The method of Embodiment 1, wherein the BWP switch is to be applied at a mini-slot or symbol level.

Embodiment 3

The method of Embodiments 1 or 2, wherein the second BWP is used for a second type of traffic and the first and second types of traffic have different quality of service (QoS) requirements.

Embodiment 4

The method of Embodiment 3, wherein one of the first type of traffic or the second type of traffic comprises ultra-reliability low latency communication (URLLC) traffic and the other one of the first type of traffic or the second type of traffic comprises enhanced Mobile Broadband (eMBB) traffic.

Embodiment 5

The method of Embodiments 3 or 4, wherein the first and second BWPs are concurrently active for first and second types of traffic.

Embodiment 6

The method of any of Embodiments 1-5, wherein the traffic comprises grant based traffic.

Embodiment 7

The method of any of Embodiments 1-6, wherein the UE is configured with a wideband BWP and the first and second BWPs are within the wideband BWP.

Embodiment 8

The method of any of Embodiments 1-7, wherein the traffic comprises grant-free or semi-persistently scheduled (SPS) based traffic.

Embodiment 9

The method of any of Embodiments 1-8, wherein the UE is pre-configured with resources for the grant-free or SPS based traffic that fit within the first BWP.

Embodiment 10

The method of any of Embodiments 1-9, wherein retransmission of the traffic is grant-free, semi-persistent scheduling (SPS) based, or grant-based.

Embodiment 11

The method of any of Embodiments 1-10, further comprising receiving signaling for an allocation of resources to the UE for the traffic independent of the BWP switch.

Embodiment 12

The method of any of Embodiments 1-11, further comprising receiving signaling for an allocation of resources to the UE for each of the first and second BWPs.

Embodiment 13

The method of Embodiment 12, wherein one of the first or second BWPs comprises a subset of the other BWP.

Embodiment 14

The method of any of Embodiments 12 or 13, wherein resource allocation of the first BWP is with respect to a reference location within the second BWP.

Embodiment 15

A method for wireless communications by a network entity, comprising determining traffic for transmission to or from a user equipment (UE) is of a first type and signaling the UE for a bandwidth part (BWP) switch for transmission of the traffic, from a first BWP to a second BWP, wherein the BWP switch is to be applied within a slot transmission time interval (TTI).

Embodiment 16

The method of Embodiment 15, wherein the BWP switch is to be applied at a mini-slot or symbol level.

Embodiment 17

The method of any of Embodiments 15 or 16, wherein the second BWP is used for a second type of traffic and the first and second types of traffic have different quality of service (QoS) requirements.

Embodiment 18

The method of Embodiment 17, wherein one of the first type of traffic or the second type of traffic comprises ultra-reliability low latency communication (URLLC) traffic and the other one of the first type of traffic or the second type of traffic comprises enhanced Mobile Broadband (eMBB) traffic.

Embodiment 19

The method of any of Embodiments 17 or 18, wherein the first and second BWPs are concurrently active for first and second types of traffic.

Embodiment 20

The method of any of Embodiments 15-19, wherein the traffic comprises grant based traffic.

Embodiment 21

The method of any of Embodiments 15-20, wherein the UE is configured with a wideband BWP and the first and second BWPs are within the wideband BWP.

Embodiment 22

The method of any of Embodiments 15-21, wherein the traffic comprises grant-free or semi-persistently scheduled (SPS) traffic.

Embodiment 23

The method of Embodiment 22, wherein the traffic comprises grant-free or semi-persistently scheduled (SPS) traffic.

Embodiment 24

The method of any of Embodiments 15-23, wherein retransmission of the traffic is grant based, semi-persistent scheduling (SPS) based, or grant-free.

Embodiment 25

The method of any of Embodiments 15-24, further comprising allocating resources to the UE for the traffic independent of the BWP switch.

Embodiment 26

The method of any of Embodiments 15-25, further comprising allocating resources to the UE for each of the first and second BWPs.

Embodiment 27

The method of Embodiment 26, wherein one of the first or second BWPs comprises a subset of the other BWP.

Embodiment 28

The method of any of Embodiments 26 or 27, wherein resource allocation of the first BWP is with respect to a reference location within the second BWP.

Embodiment 29

An apparatus for wireless communications by a user equipment (UE), comprising means for receiving signaling for a bandwidth part (BWP) switch, from a first BWP to a second BWP, to process traffic for transmission to or from the UE and means for applying the BWP switch within a slot transmission time interval (TTI) to process the traffic.

Embodiment 30

An apparatus for wireless communications by a network entity, comprising means for determining traffic for transmission to or from a user equipment (UE) is of a first type and means for signaling the UE for a bandwidth part (BWP) switch for transmission of the traffic, from a first BWP to a second BWP, wherein the BWP switch is to be applied within a slot transmission time interval (TTI).

Embodiment 31

A computer readable medium having instructions stored thereon for receiving signaling for a bandwidth part (BWP) switch, from a first BWP to a second BWP, to process traffic for transmission to or from the UE and applying the BWP switch within a slot transmission time interval (TTI) to process the traffic.

Embodiment 32

A computer readable medium having instructions stored thereon for determining traffic for transmission to or from a user equipment (UE) is of a first type and signaling the UE for a bandwidth part (BWP) switch for transmission of the traffic, from a first BWP to a second BWP, wherein the BWP switch is to be applied within a slot transmission time interval (TTI).

Embodiment 33

An apparatus for wireless communications by a user equipment (UE), comprising a receiver configured to receive signaling for a bandwidth part (BWP) switch, from a first BWP to a second BWP, to process traffic for transmission to or from the UE and at least one processor configured to apply the BWP switch within a slot transmission time interval (TTI) to process the traffic.

Embodiment 34

An apparatus for wireless communications by a network entity, comprising at least one processor configured to determine traffic for transmission to or from a user equipment (UE) is of a first type and a transmitter configured to signal the UE for a bandwidth part (BWP) switch for transmission of the traffic, from a first BWP to a second BWP, wherein the BWP switch is to be applied within a slot transmission time interval (TTI).

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, processors 460, 420, 438, and/or controller/processor 440 of the BS 110 may be configured to perform operations 800 of FIG. 8, while processors 466, 458, 464, and/or controller/processor 480 of the UE 120 may be configured to perform operations 900 of FIG. 9

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving signaling for a bandwidth part (BWP) switch, from a first BWP to a second BWP, to process traffic for transmission to or from the UE; and applying the BWP switch within a same slot transmission time interval (TTI) in which the signaling is received to process the traffic, wherein applying the BWP switch comprises at least one of: updating a BWP filtering or fast Fourier transform (FFT) adjustment at a baseband level, wherein the updating is performed at a mini-slot level such that the BWP switch takes place before an end of the same slot TTI.

2. The method of claim 1, wherein applying the BWP switch within the slot TTI to process the traffic includes applying the BWP switch at a symbol level.

3. The method of claim 1, wherein:
the first BWP is used for a first type of traffic;
the second BWP is used for a second type of traffic; and
the first and second types of traffic have different quality of service (QoS) requirements.

4. The method of claim 3, wherein:
one of the first type of traffic or the second type of traffic comprises ultra-reliability low latency communication (URLLC) traffic; and
the other one of the first type of traffic or the second type of traffic comprises enhanced Mobile Broadband (eMBB) traffic.

5. The method of claim 3, wherein:
the first and second BWPs are concurrently active for the first and second types of traffic.

6. The method of claim 1, wherein the traffic comprises grant based traffic.

7. The method of claim 1, wherein:
the UE is configured with a wideband BWP; and
the first and second BWPs are within the wideband BWP.

8. The method of claim 1, wherein the traffic comprises grant-free or semi-persistently scheduled (SPS) based traffic.

9. The method of claim 8, wherein:
the UE is pre-configured with resources for the grant-free or SPS based traffic that fit within the first BWP.

10. The method of claim 1, wherein retransmission of the traffic is grant-free, semi-persistent scheduling (SPS) based, or grant-based.

11. The method of claim 1, further comprising receiving signaling for an allocation of resources to the UE for the traffic independent of the BWP switch.

12. The method of claim 1, further comprising receiving signaling for an allocation of resources to the UE for each of the first and second BWPs.

13. The method of claim 12, wherein one of the first or second BWPs comprises a subset of the other BWP.

14. The method of claim 12, wherein resource allocation of the first BWP is with respect to a reference location within the second BWP.

15. A method for wireless communications by a network entity, comprising:
determining traffic for transmission to or from a user equipment (UE) is of a first type; and
signaling the UE for a bandwidth part (BWP) switch for transmission of the traffic, from a first BWP to a second BWP, wherein the BWP switch is to be applied within a same slot transmission time interval (TTI) during which the UE is signaled by updating a BWP filtering or fast Fourier transform (FFT) adjustment at a baseband level, and wherein the updating is performed at a mini-slot level such that the BWP switch takes place before an end of the same slot TTI.

16. The method of claim 15, wherein the BWP switch is to be applied at a symbol level.

17. The method of claim 15, wherein:
the first BWP is used for the first type of traffic;
the second BWP is used for a second type of traffic; and
the first and second types of traffic have different quality of service (QoS) requirements.

18. The method of claim 17, wherein:
one of the first type of traffic or the second type of traffic comprises ultra-reliability low latency communication (URLLC) traffic; and
the other one of the first type of traffic or the second type of traffic comprises enhanced Mobile Broadband (eMBB) traffic.

19. The method of claim 17, wherein:
the first and second BWPs are concurrently active for the first and second types of traffic.

20. The method of claim 15, wherein the traffic comprises grant based traffic.

21. The method of claim 15, wherein:
the UE is configured with a wideband BWP; and
the first and second BWPs are within the wideband BWP.

22. The method of claim 15, wherein the traffic comprises grant-free or semi persistently scheduled (SPS) traffic.

23. The method of claim 22, wherein:
the UE is pre-configured with resources for the grant-free or SPS based traffic that fit within the first BWP.

24. The method of claim 15, wherein retransmission of the traffic is grant based, semi-persistent scheduling (SPS) based, or grant-free.

25. The method of claim 15, further comprising allocating resources to the UE for the traffic independent of the BWP switch.

26. The method of claim 15, further comprising allocating resources to the UE for each of the first and second BWPs.

27. The method of claim 26, wherein one of the first or second BWPs comprises a subset of the other BWP.

28. The method of claim 26, wherein resource allocation of the first BWP is with respect to a reference location within the second BWP.

29. An apparatus for wireless communications by a user equipment (UE), comprising:
means for receiving signaling for a bandwidth part (BWP) switch, from a first BWP to a second BWP, to process traffic for transmission to or from the UE; and
means for applying the BWP switch within a same slot transmission time interval (TTI) in which the signaling is received to process the traffic, wherein applying the BWP switch comprises at least one of: updating a BWP filtering or fast Fourier transform (FFT) adjustment at a baseband level, wherein the updating is performed at a mini-slot level such that the BWP switch takes place before an end of the same slot TTI.

30. An apparatus for wireless communications by a network entity, comprising:
means for determining traffic for transmission to or from a user equipment (UE) is of a first type; and
means for signaling the UE for a bandwidth part (BWP) switch for transmission of the traffic, from a first BWP to a second BWP, wherein the BWP switch is to be applied within a same slot transmission time interval (TTI) in which the UE is signaled by updating a BWP filtering or fast Fourier transform (FFT) adjustment at a baseband level, and wherein the updating is performed at a mini-slot level such that the BWP switch takes place before an end of the same slot TTI.

31. The method of claim 1, wherein the BWP filtering comprises power analog-to-digital filtering and wherein the first BWP and the second BWP are associated with a common component carrier for fast switching.

* * * * *